United States Patent [19]

Yamada

[11] Patent Number: 4,459,691
[45] Date of Patent: Jul. 10, 1984

[54] ARRANGEMENT FOR PREVENTING DISCHARGE CURRENT FLOW BETWEEN A ROTARY RECORDING MEDIUM AND A REPRODUCING STYLUS IN A ROTARY RECORDING MEDIUM REPRODUCING APPARATUS

[75] Inventor: Kazuo Yamada, Noda, Japan

[73] Assignee: Victor Company of Japan, Ltd., Yokohama, Japan

[21] Appl. No.: 313,712

[22] Filed: Oct. 21, 1981

[30] Foreign Application Priority Data

Oct. 24, 1980 [JP] Japan ................................ 55-149805

[51] Int. Cl.³ .............................................. G11B 9/06
[52] U.S. Cl. ..................................... 369/126; 369/129
[58] Field of Search ........................... 369/126, 129, 8; 358/342

[56] References Cited

U.S. PATENT DOCUMENTS

| | | | |
|---|---|---|---|
| 2,548,211 | 4/1951 | Frantz | 369/129 |
| 3,843,846 | 10/1974 | Nutter | 369/126 |
| 3,872,265 | 3/1975 | Hilliker | 369/129 X |
| 3,873,782 | 3/1975 | Palmer | 369/126 |
| 4,080,625 | 3/1978 | Kawamoto et al. | 369/126 |
| 4,152,641 | 5/1979 | Hughes et al. | 369/126 X |
| 4,320,491 | 3/1982 | Rustman | 369/129 X |

Primary Examiner—Raymond F. Cardillo, Jr.
Attorney, Agent, or Firm—Ladas & Parry

[57] ABSTRACT

A rotary recording medium reproducing apparatus comprises a rotary recording medium in which an information signal is recorded as variations in electrostatic capacitance, wherein the rotary recording medium is rotated, a reproducing stylus for making contact with and relatively scanning over the recording surface of the rotary recording medium upon reproduction, having an electrode for detecting the information signal as variations in electrostatic capacitance, a reference potential part functioning as a reference potential point, a first direct-current connection path for connecting the rotary recording medium with the reference potential part for direct-current, and a second direct-current connection path for connecting the reproducing stylus with the reference potential part for direct-current. The second direct-current connection path including a signal pickup circuit.

3 Claims, 6 Drawing Figures

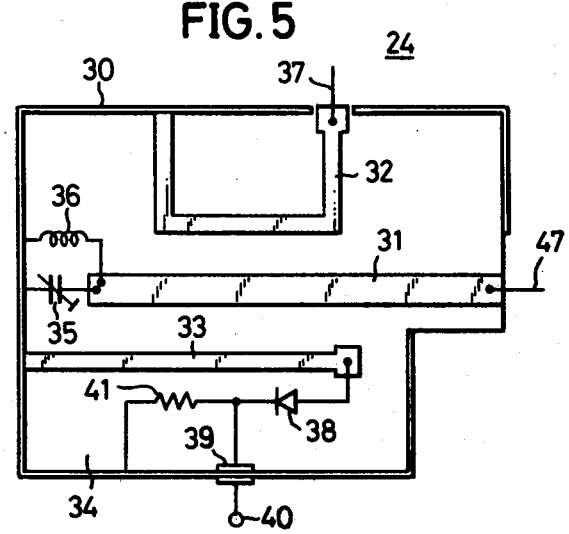
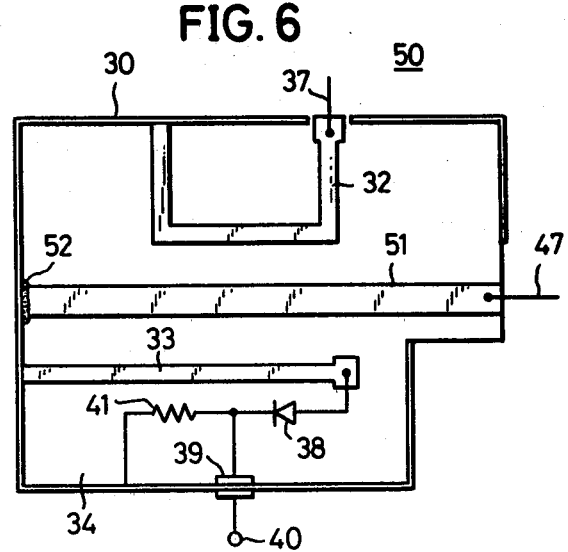

ives in a reproducing stylus in an operational state, by setting the electrical potential of a rotary recording medium to the same electrical potential as an electrode of the reproducing stylus, so that a discharge current which damages the electrode of the reproducing stylus substantially does not flow.

ARRANGEMENT FOR PREVENTING DISCHARGE CURRENT FLOW BETWEEN A ROTARY RECORDING MEDIUM AND A REPRODUCING STYLUS IN A ROTARY RECORDING MEDIUM REPRODUCING APPARATUS

BACKGROUND OF THE INVENTION

The present invention generally relates to rotary recording medium reproducing apparatuses, and more particularly to a rotary recording medium reproducing apparatus capable of protecting a reproducing stylus in an operational state, by setting the electrical potential of a rotary recording medium to the same electrical potential as an electrode of the reproducing stylus, so that a discharge current which damages the electrode of the reproducing stylus substantially does not flow.

Apparatuses have been realized for reproducing a recorded information signal according to variations in electrostatic capacitance between an electrode of a reproducing stylus and a rotary recording medium (hereinafter simply referred to as a disc) in which an information signal such as a video signal and an audio signal is recorded as variations in geometrical configuration. Upon reproduction, the reproducing stylus made of diamond makes contact with the surface of the disc which is made of a synthetic resin and rotating at a high rotational speed, to relatively scan the disc. Accordingly, electrical charges of opposite polarities are generated and accumulated at the reproducing stylus and the disc due to electrostatic induction, and a polarity difference is introduced between the reproducing stylus and the disc. Moreover, since the disc is handled when accommodated within a jacket made of a synthetic resin, the disc is in an electrified state due to the static electricity. Hence, in some cases, a potential difference already exists between the disc and the reproducing stylus at the point when the disc is loaded into the reproducing apparatus. When the potential difference between the reproducing stylus and the disc becomes large, a discharge current flows between the reproducing stylus and the disc. In this case, the electrode of the reproducing stylus is destroyed by the above discharge current, and it instantly becomes impossible for the reproducing stylus to perform reproduction.

Conventionally, in order to protect the reproducing stylus, a capacitor was provided in a path of the reproduced signal, to electrically insulate the electrode of the reproducing stylus with respect to a reference potential point on the side of the disc for direct-current. By use of this construction, the discharge current does not flow between the electrode of the reproducing stylus and the disc. The above capacitor operating to restrict the discharge current is limited to a capacitor having a low voltage rating, due to the location where the capacitor must be provided. However, in some cases, the potential difference between the disc and the reproducing stylus exceeds the above voltage rating of the capacitor. In this case, the capacitor is destroyed and the discharge current flows through the electrode of the reproducing stylus, to accordingly destroy the above electrode.

SUMMARY OF THE INVENTION

Accordingly, it is a general object of the present invention to provide a novel and useful rotary recording medium reproducing apparatus in which the above described disadvantages have been overcome.

Another and more specific object of the present invention is to provide a rotary recording medium reproducing apparatus in which a rotary recording medium is connected to a reference potential point for direct-current, and an electrode of a reproducing stylus is connected to the above reference potential point for direct-current through a resonant circuit. According to the reproducing apparatus of the present invention, the rotary recording medium and the reproducing stylus are constantly of the same electrical potential, and a discharge current substantially does not flow therebetween. Therefore, the electrode of the reproducing stylus is not destroyed under any condition due to the discharge current.

Other objects and further features of the present invention will be apparent from the following detailed description when read in conjunction with the accompanying drawings.

BRIEF DESCRIPTION OF THE DRAWINGS

FIG. 5 is a diagram showing a circuit construction within a resonant line of the reproducing apparatus shown in FIG. 1; and FIG. 6 is a diagram showing another embodiment of a circuit construction of the resonant line.

DETAILED DESCRIPTION

Figure 1:
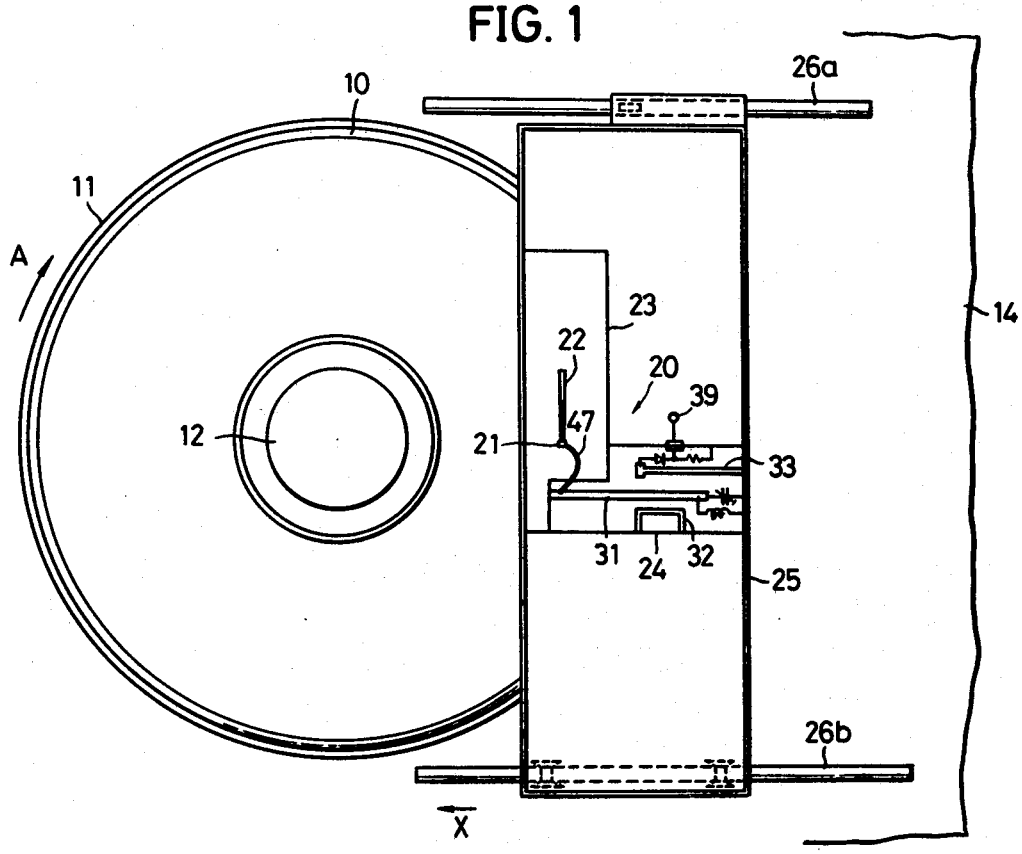
FIGS. 1 and 2 respectively are a plan view and a front view showing an embodiment of a rotary recording medium according to the present invention in a simplified manner.
Figure 2:
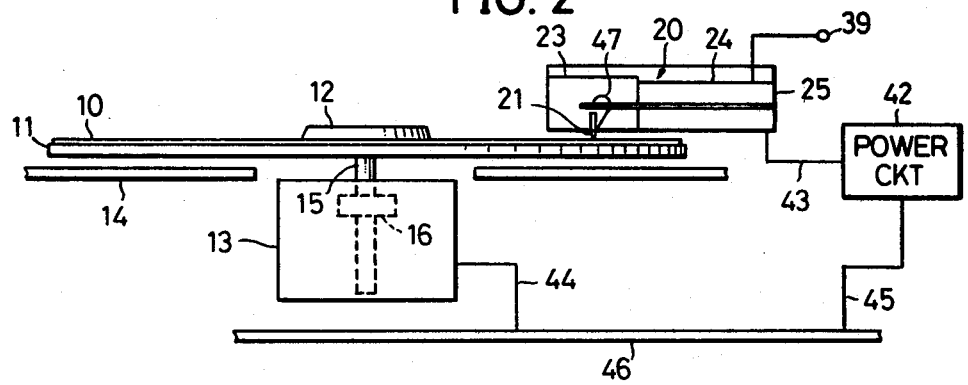
Figure 3:
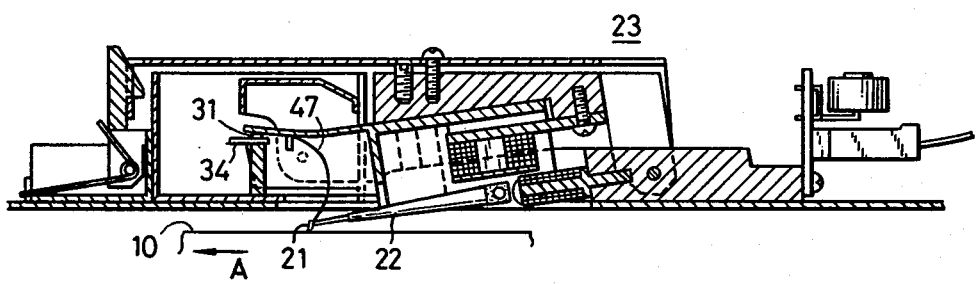
FIG. 3 is a cross-sectional view showing a signal pickup device of the reproducing apparatus shown in FIG. 1.

In FIGS. 1 through 3, a disc 10 is placed onto a turntable 11, so that the center part of the disc 10 is clamped by a clamper 12. The disc 10 is rotated together with the turntable 11 by a motor 13 at a rotational speed of 900 r.p.m., for example, in the direction of an arrow A. The turntable 11 is fixed to a rotary shaft 15 of the motor 13 which is mounted to a chassis 14.

A reproducing transducer 20 consists of a signal pickup device 23 including a cantilever 22 which is provided with a reproducing stylus 21 at the tip end thereof, and a signal pickup circuit 24. The reproducing transducer 20 is mounted to a carriage 25. This carriage 25 moves over rails 26a and 26b provided on the chassis 14, along the direction of an arrow X.

Figure 4:
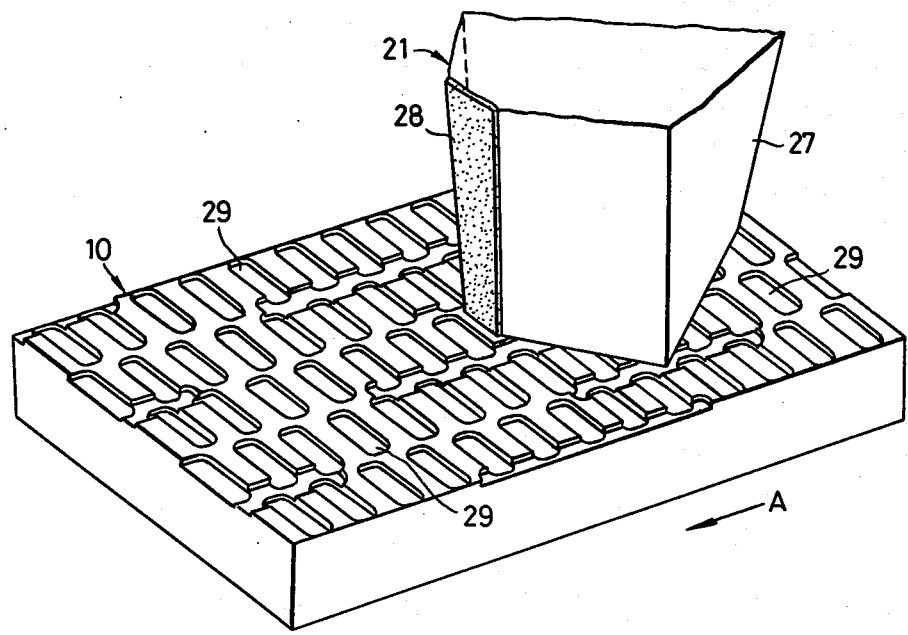
FIG. 4 is a perspective view, with a part enlarged, showing a tip end part of a reproducing stylus and a part of a rotary recording medium.

As shown in an enlarged scale in FIG. 4, the reproducing stylus 21 consists of a main stylus body 27 and an electrode 28 provided at the rear end surface of the main stylus body 27. A video signal is recorded in a spiral track on the disc 10 as shown in FIG. 4, by forming pits 29 according to the information contents of the video signal.

When the disc 10 is rotated, the reproducing stylus 21 makes contact with the recording surface of the disc 10, to scan over the tracks on the disc 10. In this state, the electrode 28 detects the recorded signal as variations in electrostatic capacitance, and the recorded signal is obtained through the signal pickup circuit 24.

As shown in FIG. 5, the signal pickup circuit 24 substantially comprises a base plate 34 provided with first, second, and third conductors 31, 32, and 33, and the like, within a frame 30 made of a metal plate. With a trimmer capacitor 35, the frame 30 and the long and narrow first conductor 31 constitute a resonant line. An end part of a metal ribbon 47 connected to the electrode 28 of the reproducing stylus 21, makes contact with one end of the first conductor 31. The other end of the first conductor 31 is connected to the metal frame 30 through the trimmer capacitor 35 of the resonant line for adjusting the resonance frequency. Moreover, this other end of the first conductor 31 and the frame 30 are connected by a coil 36. This coil 36 serves an essential role in the present invention by coupling the first conductor 31 to the frame 30 for direct current. The inductance of the coil 36 is large enough to have a relatively high impedance to an ultra-high-frequency (UHF) signal of approximately 1 GHz. A UHF oscillation signal of approximately 1 GHz is supplied to the second conductor 32 through an inlet lead wire 37, and the resonant line is driven by this UHF oscillation signal. The third conductor 33 is connected to an output terminal 40 through a detection diode 38 and a feedthrough capacitor 39. A resistor 41 is provided for passing the direct-current component.

When the electrode 28 of the reproducing stylus 21 detects the recorded signal as variations in electrostatic capacitance, the resonance frequency of the resonant line varies. Hence, the amplitude variation in the UHF oscillation signal introduced due to the above variation in the resonance frequency, is detected by a detection circuit including the detection diode 38. Therefore, the recorded signal is accordingly obtained through the output terminal 40.

As shown in FIG. 2, a power source circuit 42 for operating the signal pickup circuit 24, is connected to the signal pickup circuit 24 through an electrical wire 43.

Next, description will be given with respect to the construction for constantly maintaining the potential difference between the disc 10 and the reproducing stylus 21 to zero.

The disc 10 used in the above described reproducing apparatus is made of a synthetic resin mixed with carbon black, and is conductive. In addition, the clamper 12, the turntable 11, the motor 13, the rotary shaft 15, and the carriage 25 are all made of a conductive material. The above motor 13 and the power source circuit 42 are connected to a metal chassis 46 which functions as a reference potential point, respectively through electrical wires 44 and 45. Furthermore, a brush 16 for conduction is provided between the motor 13 and the rotary shaft 15.

Accordingly, the disc 10 is connected with the metal chassis 46 in a direct-current manner, through the clamper 12, the rotary shaft 13, the brush 16, the motor 13, and the electrical wire 44. On the other hand, the reproducing stylus 21 is connected with the metal chassis 46 in a direct-current manner, through the electrode 28, the metal ribbon 47, the first conductor 31, the coil 36, the fame 30, the carriage 25, the electrical wire 43, the power source circuit 42, and the electrical wire 45.

Hence, when the reproducing stylus 21 makes contact with the surface of the disc 10 to scan over the disc 10 upon reproduction, electrical charges of opposite polarities are generated at the disc 10 and the reproducing stylus 21 due to electrostatic induction. However, these electrical charges of opposite polarities are not accumulated, and led through the direct-current connecting path to the reference potential point. Thus, the potential difference between the disc 10 and the reproducing stylus 21 is constantly maintained to zero.

Moreover, even in a case where the disc 10 is accommodated within a jacket and is in an electrified state, the electrical potentials of the disc 10 and the reproducing stylus 21 are set to the same electrical potential, at the point when the disc 10 is placed onto the turntable 11 and clamped by the clamper 12. That is, the potential difference between the disc 10 and the reproducing stylus 21 becomes zero at the stage before the reproducing stylus 21 makes contact with the disc 10.

Therefore, a discharge current does not flow through the electrode 28 of the reproducing stylus 21. Accordingly, accidents in which the electrode 28 of the reproducing stylus 21 is destroyed by the discharge current and it becomes impossible for the reproducing stylus 21 to perform reproduction, is thus prevented.

FIG. 6 shows another embodiment of a signal pickup circuit which may be applied to the reproducing apparatus according to the present invention. In FIG. 6, those parts which are the same as those corresponding parts in FIG. 5 are designated by like reference numerals, and their description will be omitted.

A signal pickup circuit 50 is of the same construction as the above described signal pickup circuit 24, except for the first conductor. One end of a first conductor is directly connected to the frame 30 by a solder 52. The resonance frequency of the resonant line is determined by the cross-sectional area of the frame 30 and the length of the first conductor 51. The reproducing stylus 21 is connected with the metal chassis 46 through the electrode 28, the metal ribbon 34, the first conductor 51, the solder 52, the frame 30, the carriage 25, the electrical wire 43, the power source circuit 42, and the electrical wire 45.

In addition, the reproducing stylus 21 can be connected to the metal chassis 46 in a direct-current manner through a signal pickup circuit having a form of a microstrip.

Further, the present invention is not limited to these embodiments, but various variations and modifications may be made without departing from the scope of the present invention.

What is claimed is:

1. An arrangement for preventing discharge current flow between a rotary recording medium and a reproducing stylus in a rotary recording medium reproducing apparatus, said rotary recording medium having recorded thereon an information signal as variations in electrostatic capacitance and being rotated for reproduction, said reproducing stylus making contact with and scanning over the recording surface of said rotary recording medium upon reproduction and having an electrode for detecting the information signal as variations in electrostatic capacitance said arrangement comprising:
    a reference potential member functioning as a reference potential point;
    a first direct-current connection path for connecting said rotary recording medium with said reference potential member for direct-current; and
    a second direct-current connection path for connecting said reproducing stylus with said reference potential member for direct-current said second direct-current connection path including a signal pickup circuit, said signal pickup circuit having a resonant line which includes a conductive frame, a trimmer capacitor, and a strip of conductor, said strip of conductor having one end coupled to said electrode of said reproducing stylus, and having another end coupled to said frame through said trimmer capacitor, said other end of said strip of conductor being also coupled to said frame through a coil which has an inductance large enough so that an impedance thereof is relatively high at an ultrahigh frequency.

2. A reproducing apparatus as claimed in claim 1 in which said first direct-current connection path comprises:

a clamper for clamping said rotary recording medium;

a turntable for supporting said rotary recording medium;

a motor for rotating said turntable;

a brush assembled within said motor, for conducting a main motor body with respect to a rotary shaft; and means for connecting said motor to said reference potential member.

3. A reproducing apparatus as claimed in claim 1 in which said coil has said large inductance at a frequency of approximately 1 GHz.

* * * * *